(12) United States Patent
Kwiatkowski et al.

(10) Patent No.: US 7,144,536 B2
(45) Date of Patent: Dec. 5, 2006

(54) METHODS FOR MAKING PLURALITIES OF AIR DIFFUSERS FROM A SINGLE BLANK

(75) Inventors: Russ Kwiatkowski, Hudsonville, MI (US); William M. Lafayette, LaGrange, KY (US); Carl J. Stapf, Jeffersonville, IN (US); Larry W. McIntosh, Sr., Creastwood, KY (US); Earl R. Cunningham, Jr., Shelbyville, KY (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 441 days.

(21) Appl. No.: 10/445,152

(22) Filed: May 23, 2003

(65) Prior Publication Data

US 2004/0201135 A1 Oct. 14, 2004

Related U.S. Application Data

(60) Provisional application No. 60/461,768, filed on Apr. 10, 2003.

(51) Int. Cl.
*B29C 51/08* (2006.01)
*B29C 45/14* (2006.01)

(52) U.S. Cl. ............... 264/154; 264/160; 264/297.6; 264/297.8; 264/322; 264/DIG. 48

(58) Field of Classification Search ............... 264/320, 264/157, 160, 322, 325, DIG. 48, 161, 297.5, 264/297.8, 294
See application file for complete search history.

(56) References Cited

U.S. PATENT DOCUMENTS

| | | | |
|---|---|---|---|
| 3,611,481 A | 10/1971 | Malosh et al. | |
| 4,159,674 A | 7/1979 | Brumleu, Jr. | |
| 4,190,408 A | 2/1980 | Bronkema et al. | |
| 4,266,470 A | 5/1981 | Schroeder et al. | |
| 4,271,876 A | 6/1981 | Nash et al. | |
| 4,352,769 A | 10/1982 | Meyer | |
| 4,485,546 A | 12/1984 | Forslund | |
| 5,238,382 A | 8/1993 | Weder et al. | |
| 5,297,326 A | 3/1994 | Kline | |
| 5,382,148 A | 1/1995 | Buckley | |
| 5,382,152 A | 1/1995 | Ravera | |
| 5,642,601 A | 7/1997 | Thompson, Jr. et al. | |
| 5,658,196 A | 8/1997 | Swaim | |
| 5,866,060 A | 2/1999 | Buckley | |
| 6,001,300 A | 12/1999 | Buckley | |

*Primary Examiner*—Edmund H. Lee
(74) *Attorney, Agent, or Firm*—Inger H. Eckert; Margaret S. Millikin

(57) ABSTRACT

Methods are provided for forming a plurality of air diffusers from a single fiberglass and foil blank. At an automated pre-forming station upstream of a molding station, a blank has pressed therein two air diffuser patterns at a middle portion, two patterns at a first catercorner portion and two patterns at a second catercorner portion and the pressing of each set of two patterns occurs substantially simultaneously to prevent the foil from delaminating from the fiberglass. Thereafter, the blank is fed to a molding station that applies a significantly larger pressing force and heats the blank to form six air diffusers. Perforations are cut in the blank to facilitate separation of the air diffusers in a trimming station downstream of the molding station. Preferred pressing of air diffuser patterns occurs with pneumatic actuated male and female air diffuser pattern molds that are sequentially operated in accordance with a desired pattern.

18 Claims, 4 Drawing Sheets

# METHODS FOR MAKING PLURALITIES OF AIR DIFFUSERS FROM A SINGLE BLANK

TECHNICAL FIELD AND INDUSTRIAL APPLICABILITY OF THE INVENTION

The present invention relates generally to air diffusers and, more particularly, to methods for making pluralities of air diffusers from a single fiberglass and foil blank. Even more particularly, the invention relates to automated pre-forming of the blank with pneumatic pattern molds at a pre-forming station upstream of a molding station without delaminating the foil from the fiberglass or causing other material damage.

BACKGROUND OF THE INVENTION

Air diffusers have long been known in heating, ventilation and air conditioning systems. Because of condensation and moisture concerns, many present day air diffusers are heavily insulated and/or formed of materials other than metals. Typically, fiberglass is the material of choice for such air diffusers or insulation (hereinafter, collectively air diffusers) and often times a foil sheet, such as aluminum, covers one side of the fiberglass as is well known in the art.

During manufacture of such fiberglass and foil air diffusers, a mechanical molding apparatus clamshells the fiberglass and foil between a male and female mold of an appropriate shape and applies heat. Before molding, however, a human operator typically Apreforms@ the fiberglass and foil material by hand into a shape comparable to the mold shapes to prevent the foil from delaminating from the fiberglass or to prevent other damage to the materials since molding generally occurs under severe operating conditions with forces on the order of 10–12 tons and temperatures of 400EF being typical. Although necessary, the preforming step occurs one air diffuser per one operator at a time thereby making it manually intensive. In addition, it presently consumes a disproportionate amount of the manufacturing time.

Accordingly, the air diffuser arts desire improvements having economic and expeditious benefits in the manufacture thereof.

SUMMARY OF THE INVENTION

In accordance with the purposes of the present invention as described herein, methods are provided for forming pluralities of air diffusers from a single fiberglass and foil blank.

At an automated pre-forming station, a blank has pressed therein two air diffuser patterns at a middle portion, two air diffuser patterns at a first catercorner portion and two air diffuser patterns at a second catercorner portion and the pressing of each set of two air diffuser patterns occurs substantially simultaneously to prevent foil delaminating from the fiberglass. Thereafter, the blank is fed to a molding station that applies a significantly larger pressing force and heats the blank to form six air diffusers therein. Upon passage through a trimming station, the blank has perforations cut about each air diffuser and an operator pushes out pluralities therefrom.

In other embodiments, the pressing of air diffuser patterns at the pre-formation station occurs with pneumatic actuated male and female air diffuser pattern mold pairs that are sequentially operated in accordance with the pattern: female mold pairs uplift into an undersurface of the blank; male mold pairs down-press into an upper surface of the blank for a sufficient mold time under a sufficient mold force; male mold pairs uplift from the upper surface; and female mold pairs are removed downward from the undersurface.

Preferably, the pre-forming station presses the male and female mold pairs at a force of about 500 pounds for a combined time of about 30 seconds. The molding station presses male and female mating mold pairs at a force of about 10 to 12 tons for about 60 seconds at a temperature of about 400EF. The trimming station presses a steel rule die into the blank and forms perforations therein at force process conditions comparable to the molding station. Chains convey the blank from station to station along a common assembly path.

In addition, a control system comprises a programmed logic computer interfacing with five stations (loading, pre-forming, molding, trimming and product eject) of the air diffuser formation process to insure relative coordination there between. Each station exists on a common frame and is spaced about 88 inches center-to-center.

In another embodiment, the blank embodies a rectangular shape with four corner regions and pressing of the air diffuser patterns occurs as three sets of two substantially simultaneously formed patterns occurring first in the middle portion of the blank, second in two corner sections of the blank and third in the remaining two corner sections of the blank. The blank may comprise a two-layer structure with a fiberglass layer underlying a foil layer and may have dimensions of about 103 inches by about 64 inches in the process direction. Preferably, the foil is about 1 mil thick while the fiberglass is about 1 inch thick and a finished air diffuser product is about 24 inches square with a 4.5 inch draw.

In the following description there is shown and described methods for forming pluralities of air diffusers from a single blank at a pre-forming station upstream of molding station. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWINGS

The accompanying drawings, incorporated in and forming a part of the specification, illustrate several aspects of the present invention and together with the description serve to explain the principles of the invention. In the drawings.

Reference will now be made in detail to the present preferred embodiments of the invention, examples of which are illustrated in the accompanying drawing.

DETAILED DESCRIPTION AND PREFERRED EMBODIMENTS OF THE INVENTION

Figure 1:
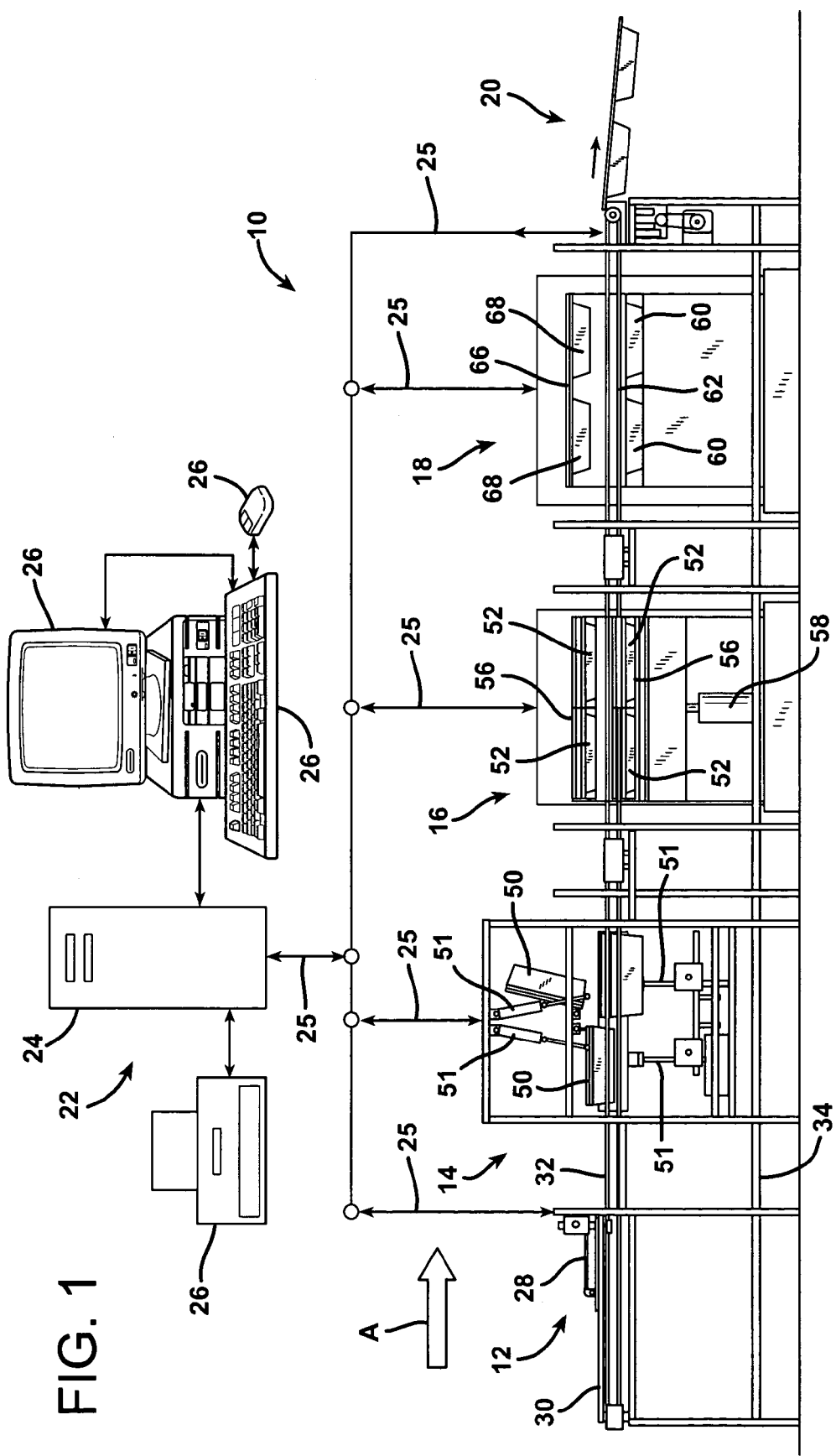
FIG. 1 is a diagrammatic side view of an automated five-station air diffuser formation process.

Reference is now made to FIG. 1 schematically illustrating an automated five-station air diffuser formation process 10 of the present invention that yields multiple air diffusers from a single starting material blank, especially through application of an automated pre-formation station that presses air diffuser patterns in the blank upstream of a molding station.

In general, the five stations of the air diffuser formation process include: a loading station or section 12; a pre-forming station 14; a molding station 16; a trim station 18; and a product eject station 20. A control system 22 comprised of a programmed logic computer 24 and attendant peripherals 26 interconnects with all five processing stations (indicated by the bi-directional communication lines 25) to coordinate relative actions of each of the stations during use. In a preferred embodiment, code of the computer 24 is written based upon relative cycle times of each station and timing related to an electric driven chain bar 28 (only one shown in FIG. 1) that drags and or pushes a blank 30 from station to station in a direction of process (Arrow A) along a common reference plane 32 built on a common frame 34 that houses the stations in a center-to-center spacing of about 88 inches.

Figure 2:
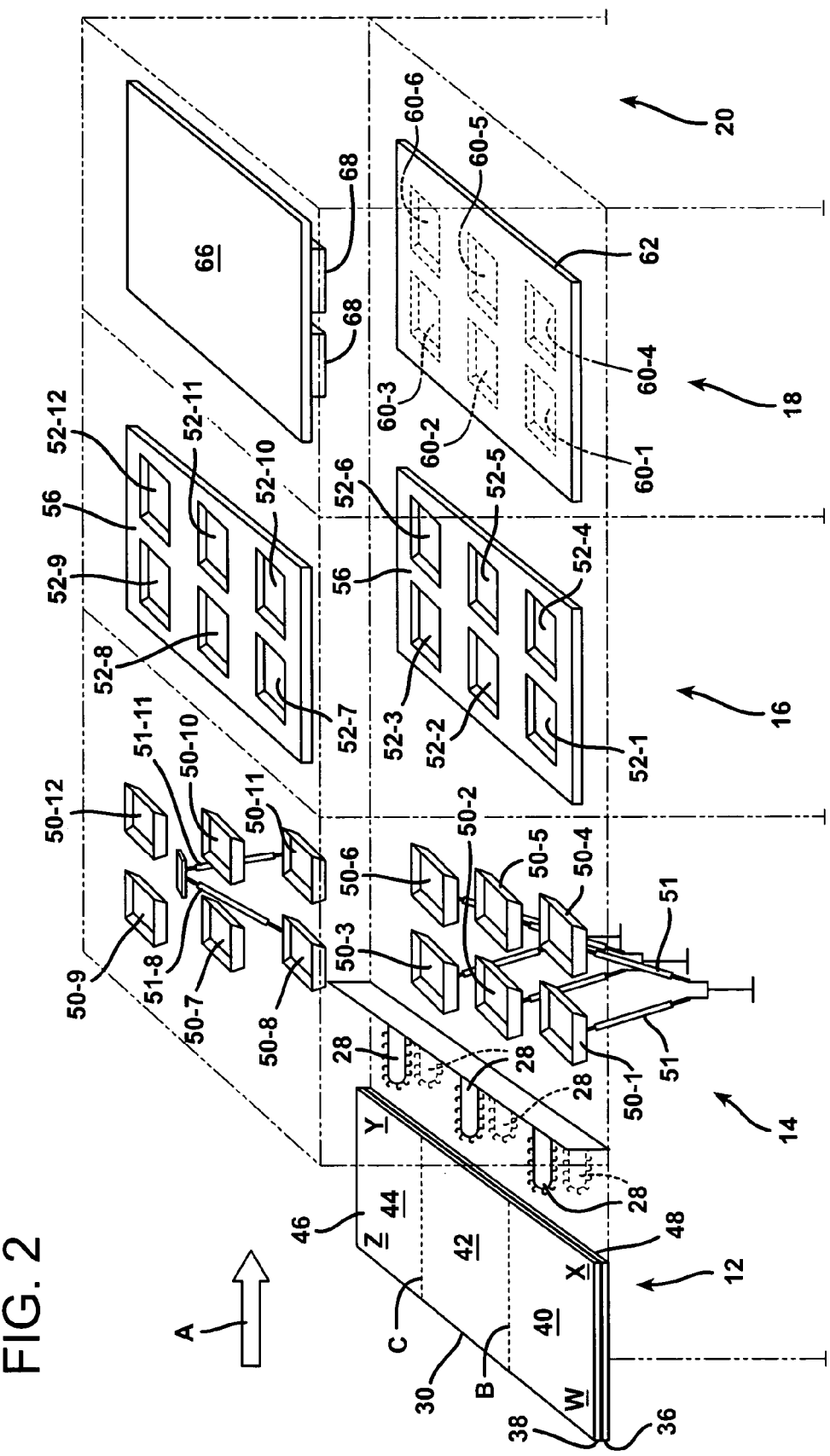
FIG. 2 is an abbreviated perspective view of the air diffuser formation process of FIG. 1.

As best seen in FIG. 2, the blank 30 preferably embodies a two-layer structure of fiberglass 36 and a facing foil 38 shaped as a rectangle with a longitudinal extent of about 103 inches and a transverse extent of about 63 inches in the process direction. In one embodiment, the fiberglass layer is a fiberglass molding media well known in the art and has a thickness of approximately 1 inch while the foil layer is an aluminum sheet and has a thickness of about 1 mil. To facilitate later discussion, the blank 30 is theoretically divided into first, second and third portions, as designated by reference numerals 40, 42 and 44 separated by dashed lines B and C, and it has four corner regions w, x, y, and z. To enter the blank into the automated air diffuser formation process, an operator merely places the blank on a surface of the loading station and initiates a start routine by engaging a start switch (not shown), button or the like. Preferably, but not required, the operator lays the blank in a foil-up manner.

In sequence, the chain bar 28, preferably a plurality of chains that rotate in the process direction and rotate in contact with upper 46 and undersurfaces 48 of the blank, pulls the blank and feeds it to the pre-forming station 14 such that a center of the blank is aligned generally with a center of the station.

At the pre-forming station, the blank is engaged by a plurality of upper and lower mating molds 50 that automatically pre-form pluralities of air diffuser patterns in the surfaces of the blank in preparation of a downstream traditional molding process. In a preferred embodiment, the molds 50 engage the blank as follows: two female molds 50-2, 50-5 uplift into an undersurface 48 of an initial or middle portion 42 of the blank 30; two male molds 50-8, 50-11 down-press into an upper surface 46 of the blank and clamshell the middle portion of the blank between the molds; after a sufficient time, the male mold pairs uplift from the upper surface; and the female mold pairs are removed downward from the undersurface thereby leaving the blank at its starting position with two impressions of air diffuser patterns rendered in the middle portion thereof. Thereafter, catercorner (informally Akiddie corner@) regions of the blank, i.e., corner regions w and y or x and z, are engaged in the same sequence with molds 50-1, 50-6, 50-7 and 50-12 or 50-4, 50-3, 50-10 and 50-9, respectively, thereby rendering the blank with six air diffuser patterns in surfaces thereof.

In another preferred embodiment, the air diffuser pattern molds 50 press with a force of about 500 pounds generated by an appropriate pneumatic or hydraulic cylinder 51 mounted to the common frame 34 for a combined time (e.g., forming all six air diffuser patterns) of about 30 seconds. It has been discovered that such a processing sequence renders the air diffuser patterns in the blank without delaminating the foil from the fiberglass or otherwise causing damage to the materials of the blank. Further, it should be appreciated that the molding occurs as three sets of two air diffuser patterns (i.e., 3×2) with each of the two patterns per set (in either the middle portion 42, or the outer portions 40, 44) being formed at substantially the same time which allows appropriate amounts of blank material from other portions of the blank to fill the molds without, in turn, causing damage to the blank.

As a result, six air diffuser patterns are preformed in the blank with very little human intervention in approximately the same time it would take six operators to preform six different blanks with one preformed air diffuser pattern.

Those skilled in the art should also appreciate that other patterns and other sequences of molding air diffuser patterns can be implemented and still fall within the metes and bounds of the present invention. For example, this invention contemplates four sets of two air diffuser patterns (i.e, 4×2), two sets of two air diffuser patterns (2×2), three sets of one air diffuser patterns (3×1), three sets of three air diffuser patterns (3×3) or other.

After the pre-formation station, the blank with the six air diffuser patterns is delivered or fed in the process direction downstream to a molding station 16. At this station, pluralities of mating molds 52, preferably female molds 52-1 through 52-6 and male molds 52-7 through 52-12, simultaneously clamshell or pinch all of the pre-formed air diffuser patterns therein at a force of about 10–12 tons for a period of 60 seconds and at a temperature of about 400EF to completely form the air diffusers. In one embodiment, the sequence of events occurs as follows: the blank remains stationary on the common reference plane and the female molds uplift to capture the pre-molded air diffuser patterns; the male molds down press into the female molds for the stated time and pressure thereby pinching the air diffuser patterns; the male molds uplift; and the female molds are removed downward from the undersurface of the blank. In another embodiment, all of the female molds and all of the male molds are mounted on steel plates 56 that are caused to move in a clamshell motion according to actuation of a master pneumatic or hydraulic cylinder(s) 58. Regarding heating, it is preferred to heat the steel plates themselves and transfer heat to each of the individual molds through conduction.

After the molding station, the blank with the six air diffusers formed therein is delivered or fed in the process direction downstream to a trimming station 18. At this station, the air diffusers nest within spaces 60 of a platform 62 such that, upon actuation of another pneumatic or hydraulic cylinder (not shown), a steel rule die 66 with pluralities of individual dies 68 cuts perforations into surfaces of the blank to facilitate separation of the individual air diffusers in the product ejection station. In a preferred embodiment, the steel rule die is actuated with 10–12 tons of force for a period of about 15–20 seconds. Although perforations are preferred, so that a single blank with air diffusers therein can be advanced to a final processing station as a complete unit, the dies may be alternatively configured to completely cut or sever the air diffusers free from the remaining blank material at the trim station.

Finally, at the product ejection station 20, operators press or push-out individual air diffusers along the perforations such that pluralities of individual air diffusers are fabricated from a single blank. In one embodiment, the final air diffuser products have a planar length and width dimension of about 24 inches squared and a draw or depth of about 4.5 inches. Other sizes and shapes, however, are contemplated herein and are generally achieved by altering the size and shapes of the air diffuser pattern molds 50, molds 52 and dies 68 in each of their respective processing stations.

Figure 3:
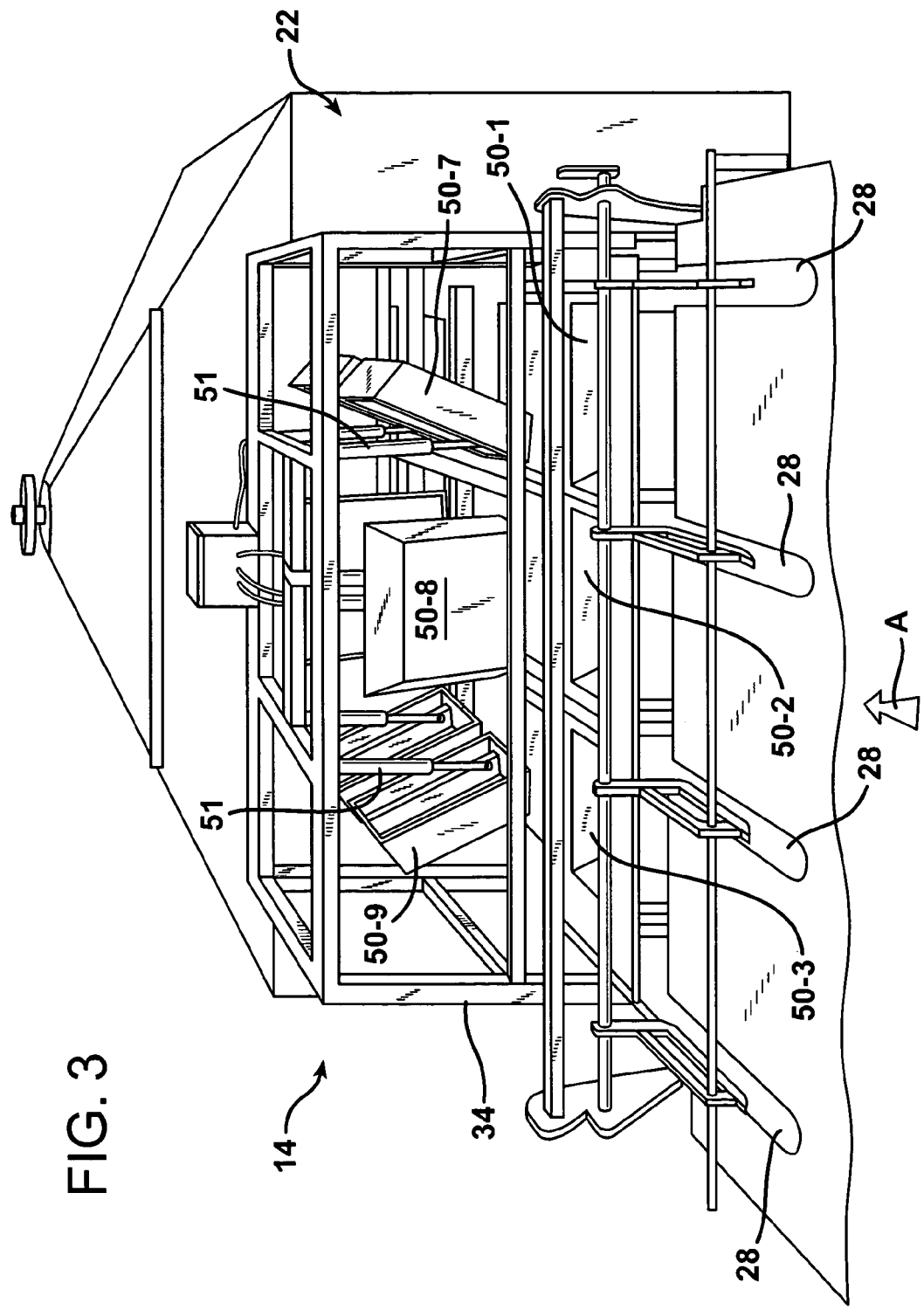
FIG. 3 is an end view of a pre-formation station of the air diffuser formation process as viewed from an upstream loading station.
Figure 4:
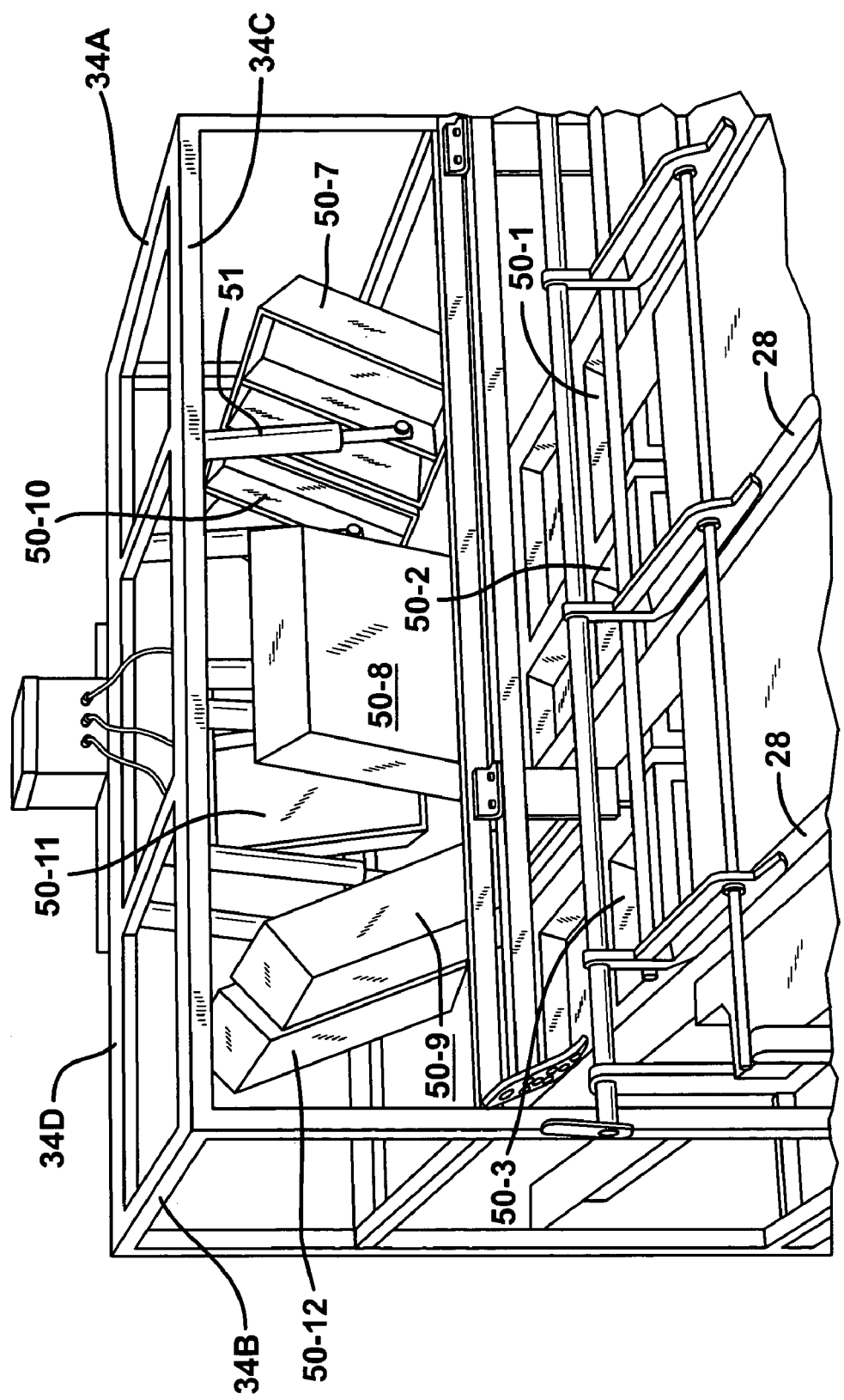
FIG. 4 is a more detailed view of the pre-formation station of FIG. 3.

With reference to FIGS. 3 and 4, another embodiment of the pre-formation station 14 contemplates pluralities of male molds 50 in non-use positions resting relative to the common frame 34 such that male mold pairs 50-7, 50-10 and 50-9, 50-12 are arranged two per frame sides 34-A and 34-B, respectively. Simultaneously, male molds 50-8 and 50-11 are arranged one per frame side 34-C and 34-D, respectively, and each of the male molds 50 rotate downward into contact with a blank upon actuation of an attendant cylinder. In this manner, the common frame 34 may be made compact for space-saving purposes.

The embodiments herein chosen and described provide the best illustration of the principles of the invention and its practical application to thereby enable one of ordinary skill in the art to utilize the invention. All modifications and variations thereto are within the scope of the invention as determined by the appended claims when interpreted in accordance with the breadth to which they are fairly, legally and equitably entitled.

What is claimed:

1. A method of forming a plurality of air diffusers from a single blank, comprising:
   feeding said blank to a pre-forming station upstream of a molding station;
   pressing two air diffuser patterns into said blank at substantially the same time at said preforming station;
   feeding said pre-formed blank to a molding station; and
   feeding said pre-formed and molded blank to a trimming station after said step of feeding said pre-formed blank to a molding station.

2. The method of claim 1, further including the step of pressing said two air diffuser patterns in a mating mold after feeding the preformed blank into said molding station and subsequently feeding said preformed and molded blank to said trimming station.

3. The method of claim 2, further including the step of heating said mating mold thereby yielding two air diffusers in said preformed blank.

4. The method of claim 1, further including the step of cutting perforations in said blank.

5. A method of forming a plurality of air diffusers
   from a single fiberglass blank, comprising:
   feeding said blank to a pre-forming station;
   pressing a first set of two air diffuser patterns into said blank at a middle portion of said blank at said pre-forming station;
   pressing a second set of two air diffuser patterns into said blank at a first two corners thereof at said pre-forming station; and
   pressing a third set of two air diffuser patterns into said blank at a second two corners thereof, wherein each said set of two air diffuser patterns is pressed at substantially the same time at said pre-forming station;
   feeding said pre-formed blank to a molding station; and
   feeding said pre-formed and molded blank to a trimming station after said step of feeding said pre-formed blank to a molding station.

6. The method of claim 5, further including pressing said each set of two air diffuser patterns in a mating mold.

7. The method of claim 6, further including heating said mating mold thereby yielding six air diffusers in said blank.

8. The method of claim 7, Further including cutting perforations in said blank.

9. A method of forming a plurality of air diffusers, comprising:
   feeding a fiberglass and foil first blank to a pre-forming station;
   substantially simultaneously, pressing an initial two air diffuser patterns into said first blank at said pro-forming station between two molds;
   substantially simultaneously, pressing an intermediate two air diffuser patterns into said first blank at said pre-forming station between two molds;
   substantially simultaneously, pressing a final two air diffuser patterns into said first blank at said pro-forming station between two molds;
   feeding said pressed, first pre-formed blank to a molding station such that each of said two air diffuser patterns mate with a female air diffuser mold;
   pressing a male air diffuser mold into each said female air diffuser mold;
   heating said each female and male mold thereby yielding six air diffusers in said pressed, first pre-formed blank;
   feeding said heated, pressed first pre-formed blank to a trimming station after said step of feeding said first pre-formed blank to a molding station; and
   cutting said first pre-formed and molded blank at said trimming station.

10. The method of claim 9, wherein said feeding said fiberglass and foil blank to said pre-forming station further includes feeding said blank in a foil-up manner.

11. The method of claim 9, wherein said pressing said initial two air diffuser patterns further includes pressing in a middle portion of said pre-formed blank.

12. The method of claim 9, wherein said pressing said intermediate two air diffuser patterns further includes pressing in two corners of said pre-formed blank.

13. The method of claim 9, wherein said pressing said final two air diffuser patterns further includes pressing in two corners of said pre-formed blank.

14. A method of forming a plurality of air diffusers from a single blank, comprising:
   feeding a fiberglass and foil first blank to a pre-forming station;
   substantially simultaneously, pressing an initial two air diffuser patterns into said first blank in a middle portion thereof at said pre-forming station between two molds;
   substantially simultaneously, pressing an intermediate two air diffuser patterns into said first blank in a first two corners thereof at said pre-forming station between two molds;
   substantially simultaneously, pressing a final two air diffuser patterns into said blank in a second two corners thereof at said pre-forming station between two molds;
   feeding said pressed, pre-formed first blank to a molding station such that each of said two air diffuser patterns mate with a female air diffuser mold;
   pressing a male air diffuser mold into each said female air diffuser mold;
   heating said each female and male mold thereby yielding six air diffusers in said pressed, pre-formed first blank;
   feeding said heated, pressed, pre-formed first blank to a trimming station; and cutting perforations in said heated, pressed first pre-formed blank at said trimming station.

15. The method of claim 14, wherein each said pressing said two air diffuser patterns further includes uplifting two female air diffuser pattern molds into an undersurface of said blank at said pre-forming station.

16. The method of claim 15, further including down-pressing two male air diffuser pattern molds into an upper surface of said blank at said pre-forming station.

17. The method of claim 16, further including uplifting said two male air diffuser pattern molds from said upper surface of said blank at said pre-forming station.

18. The method of claim 17, farther including removing said two female air diffuser pattern molds from said undersurface of said blank at said pre-forming station.

* * * * *